United States Patent [19]
Albers et al.

[11] Patent Number: 5,711,930
[45] Date of Patent: Jan. 27, 1998

[54] PROCESS FOR IMPROVING THE PHYISCAL PROPERTIES OF FORMED PARTICLES

[75] Inventors: Edwin W. Albers, Severna Park; Harry W. Burkhead, Jr., Arbutus, both of Md.

[73] Assignee: Thiele Kaolin Company, Sandersville, Ga.

[21] Appl. No.: 288,504

[22] Filed: Aug. 10, 1994

Related U.S. Application Data

[63] Continuation-in-part of Ser. No. 276,318, Jul. 15, 1994, which is a continuation of Ser. No. 904,336, Jun. 25, 1992, Pat. No. 5,330,943, which is a continuation of Ser. No. 562,905, Aug. 6, 1990, Pat. No. 5,135,756, which is a continuation-in-part of Ser. No. 321,355, Mar. 10, 1989, Pat. No. 4,946,814.

[51] Int. Cl.⁶ ........................................................ C01F 7/02
[52] U.S. Cl. ................................................ 423/625; 423/628
[58] Field of Search ............................ 23/293 R; 502/62; 423/625, 628

[56] References Cited

U.S. PATENT DOCUMENTS

| | | | |
|---|---|---|---|
| 2,988,520 | 6/1961 | Braithwaite | 423/628 |
| 4,010,116 | 3/1977 | Secor et al. | |
| 4,019,978 | 4/1977 | Miller et al. | 423/628 |
| 4,066,740 | 1/1978 | Erickson | 423/628 |
| 4,154,812 | 5/1979 | Sanchez et al. | 423/628 |
| 4,946,814 | 8/1990 | Shi et al. | 502/62 |
| 5,135,756 | 8/1992 | Shi et al. | 502/68 |

FOREIGN PATENT DOCUMENTS 1497932   1/1978   United Kingdom .

Primary Examiner—Wayne Langel
Attorney, Agent, or Firm—Cammarata & Grandinetti

[57] ABSTRACT

A process for significantly improving the physical properties of formed particles is disclosed. The process includes adding an effective amount of an acid stable surfactant or an alkaline stable surfactant to a component of the material before drying the particles. The preferred particles are microspheroidal for use in fluid bed reactors, but can include granules and beads.

1 Claim, 2 Drawing Sheets

PROCESS FOR IMPROVING THE PHYISCAL PROPERTIES OF FORMED PARTICLES

This is a continuation-in-part of copending U.S. patent application Ser. No. 08/276,318, filed Jul. 15, 1994, pending, which is a continuation of U.S. patent application Ser. No. 07/904,336, filed Jun. 25, 1992, now U.S. Pat. No. 5,330,943, which is a continuation of U.S. patent application Ser. No. 07/562,905, filed Aug. 6, 1990, now U.S. Pat. No. 5,135,756, which is a continuation-in-part of U.S. patent application Ser. No. 07/321,355, filed Mar. 10, 1989, now U.S. Pat. No. 4,946,814, issued Aug. 7, 1990.

BACKGROUND OF THE INVENTION

1. Technical Field of the Invention

This invention relates to a process for preparing and improving the physical properties of formed particles. Particularly, this invention relates to a process for preparing formed particles by adding at least one surfactant to one or more particle components prior to drying the particles.

2. Description of the Background Art

Particles for use in fluid bed reactors, sieves, and other industrial applications are formed by numerous processes. The objective of the particular process for forming the particles is to obtain particles of uniform size and density with a minimum of fines and with desirable physical characteristics. Desirable physical characteristics include low attrition rates wherein the integrity of the particles resists breakage during use in a fluid bed or similar operation.

U.S. Pat. Nos. 4,946,814 and 5,141,905 to Shi et al. disclose a process for improving the physical and catalytic properties of a fluid cracking catalyst. These patents are primarily directed to preparing particles for fluid cracking catalysts because of the commercial significance of such particles. However, the extension of the use of the processes of these patents for forming other particles is disclosed. For example, it is explained in the '905 patent that the basic process can be adapted to form particles for non-catalytic or separation-type materials. In particular, it is disclosed that particles used in binding ceramics and superconducting formulations are improved by the basic process. These particles are typically based on a variety of inorganic oxide systems. The present application continues in part from the disclosures of these patents and hereby incorporates these patents by reference.

U.S. Pat. No. 5,254,516 to Gupta et al. discloses fluidizable zinc titanate materials with high chemical reactivity and attrition resistance. The particles disclosed by this patent are formed from inorganic oxides. Specifically, the particles are formed from zinc oxide and titanium dioxide and can include an inorganic binder which is desirably one of the clays, bentonits or kaolinits. The particles of this patent are formed by a granulator. The disclosed wet granulation procedures are undesirable because of their "batch mode" of operation and their production of particles having less than desired attrition rates. The disclosure of this patent that is related to the compositions of fluidizable zinc titanate materials is herein incorporated by reference.

The industry lacks an efficient and economical process for producing formed particles, such as those particles used in fluid bed reactors, which are microspheroidal without a significant presence of "blow-holes" or cavernous openings and which have desirable attrition rates.

SUMMARY OF THE INVENTION

The invention is a process for improving the physical properties of a formed particle material. The process involves adding an effective amount a surfactant to at least one component of the formed particle material. The surfactant is an acid stable surfactant, an alkaline stable surfactant, or mixtures of these.

The preferred embodiment of the invention is a process for improving the physical properties of a formed particle of zinc titanate. The process involves blending an inorganic binder, an organic binder, and an anionic acid stable fluorohydrocarbon surfactant. Then, blending zinc oxide and titanium dioxide in a molar ratio of about 0.8 to about 1.5 with the inorganic binder, the organic binder, and the anionic acid stable fluorohydrocarbon surfactant follows to form a zinc titanate composition. Spray drying the zinc titanate composition then occurs followed by calcining the dried zinc titanate composition at a temperature greater than 800° C. for at least 1.5 hours.

A desirable organic binder can include hydroxypropyl methyl cellulose, polyvinyl acetate, starch, molasses, lignin sulfonate, hydroxy propyl cellulose, or mixtures of these.

A desirable inorganic binder is a clay such as bentonite, calcined kaolinite, kaolinite, metakaolin, montmorillonite, talc, or mixtures of these.

DETAILED DESCRIPTION OF THE INVENTION

Figure 1A:
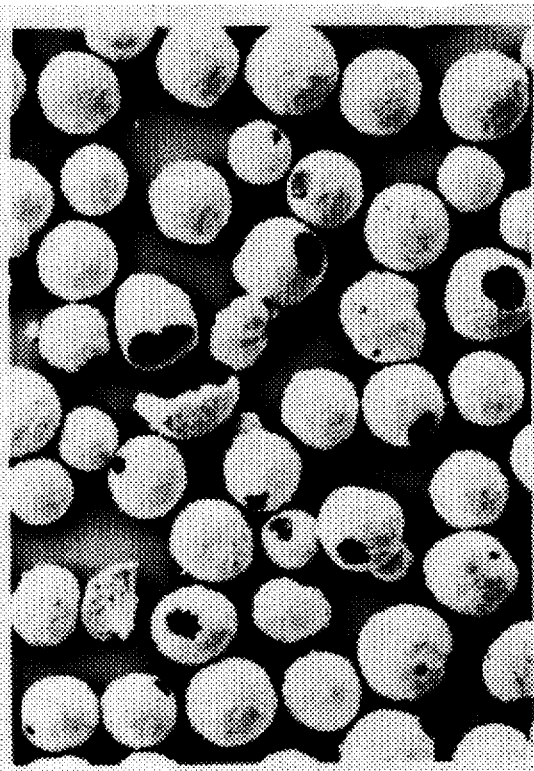
FIGS. 1A and 1B are photo-lithographs illustrating typical catalyst particle morphology provided by a silica-alumina sol-type binder system.

The invention is a process for manufacturing formed particles. The process includes adding an effective amount of an acid stable surfactant or an alkaline stable surfactant to a component of the formed particle. Desirably, the component of the formed particle is a slurry of an inorganic oxide component. The process can include adding binders to the inorganic oxide component and drying the blended components to form particles. The dried particles are calcined and can provide non-catalytic or separation-type materials. The materials are often used in fluid or moving beds, ebullient beds, and sieves and to a limited extent in green bodies. The term "particle" as used in this specification usually refers to a microspheroidal particle, but can include certain agglomerates that benefit from being formed by the invention such as granules and beads.

The invention forms particles for non-catalytic or separation-type materials. Desirable compounds for these materials include inorganic oxides. Desirable inorganic oxides include metal oxides being a member from the group consisting of alumina, calcium oxide, cobalt oxide, copper oxides, iron oxide, magnesium hydroxide, magnesium oxide, molybdenum oxide, titanium dioxide, vanadium oxide, zinc oxide, and combinations thereof. The preferred embodiment of this invention forms zinc titanate materials. These zinc titanate materials contain zinc oxide and titanium dioxide in a molar ratio of about 0.8 to about 1.5. The preferred zinc titanate material has between 2 and 5 percent by weight bentonite. The invention can also form particles for other non-catalytic or separation-type materials that can include other alkaline earth compounds, sodium bicarbonate, iron nitride, silicon nitride, iron carbide, silicon carbide, single metal oxide sorbents, zinc ferrite, and perovskite materials. Perovskite materials can include a superconductor being a member selected from the group consisting of $Ba_xLa_{5-x}Cu_5O_{5(3-y)}$, $(La_{0.9}Ba_{0.1})_2CuO_{4-\delta}$ at 1 GPa, $YBa_2Cu_3O_{7-\delta}$, BiSrCaCuO, TlBaCaCuO, and mixtures of these.

The non-catalytic or separation-type materials, such as inorganic oxides, for use with this invention are commercially available. For example, desirable zinc oxide powder for use with this invention has an average particle size of 0.12 micron with a surface area of 9 square meters per gram ($m^2/g$) and is 99.4 percent pure. Desirable titanium dioxide ($TiO_2$) powder has an average particle size of 0.5 micron with a surface area of 12 $m^2/g$ and is 94 percent pure. Other non-catalytic or separation-type materials, having these general characteristics, can be used with the invention.

Alumina is another example of an inorganic oxide material that can be formed and/or processed by the invention. Both standard and stabilized gel-based aluminas, when processed with a surfactant according to this invention, exhibit improved stability and dispersibility. The improved dispersibility of these aluminas with noble metals can reduce the amount of noble metal usage by 15 to 20 percent. The result of the improved dispersibility with noble metals significantly reduces the expense of producing monolith bodies for exhaust system catalysts. The improved gel-based alumina also provides improved hydrotreating catalysts to remove sulfur from gasoline feed stocks. Alumina hydrotreating catalysts are typically impregnated with cobalt molybdenum or tungsten molybdenum compounds.

Inorganic binders for use with this invention are commercially available and are selected for their ability to bind the specific material being processed. Desirable inorganic binders include a member selected from the group consisting of bentonite, calcium sulfate, feldspar, forsterite, kaolinite, oil shale, portland cement, vermiculite, and mixtures of these. Other inorganic binders can be used and can include other clays such as montmorillonite.

Inorganic binders are used in an amount sufficient to bind the non-catalytic or separation-type material being processed by the invention. Desirable concentrations of inorganic binders are from about 2 to about 15 weight percent.

Organic binders for use with this invention are commercially available and are selected for their ability to bind the specific material being processed. Desirable organic binders include a member selected from the group consisting of hydroxypropyl cellulose, hydroxypropyl methyl cellulose, lignin sulfonate, molasses, polyvinyl acetate, starch, and mixtures of these. Other organic binders can be used with this invention.

Organic binders are also used in an amount sufficient to bind the non-catalytic or separation-type material being processed by the invention. Desirable concentrations of organic binders are from about 0.1 to about 10 percent by weight. The viscosity of the particular grade and type of the selected organic binder can alter the concentration required to bind the material being processed.

Activator, promotor, and/or scavenger compounds are often included in the materials made by this invention. Such materials can include alkali oxides, such as nahcolite and trona, which scavenge hydrochloric acid. Materials for decomposing ammonia can be included such as combinations of Group VIII metal oxides, such as those derived from cobalt and nickel, with Group VIB metal oxides, such as those derived from molybdenum and tungsten, with or without additional Group VIIB and Group VIII metals, such as rhenium and iridium.

The concentrations of the activator, promotor, and/or scavenger compounds used with the invention must be sufficient to provide the desired function. Activator or promotor compounds selected from the group consisting of Groups VIB, VIIB, and VIII metal compounds and Groups IA and IIA alkali and alkaline earth metal compounds can be used in concentrations up to about 10 percent.

Numerous surfactants can be used with this invention. A surfactant is initially selected for its stability in the component to which it is added. For example, the surfactant can be added to numerous "streams" that are used in the process of this invention. A stream is often a slurry of a component used to form the desired particle. A stream can be a dry component. If a stream, within which a surfactant is to be added, is acidic or alkaline, a surfactant must be chosen that is stable in the pH of the selected stream. Information regarding the pH stability of a surfactant is usually provided by the manufacturer of the surfactant. A surfactant that is stable in acid is known as an "acid stable surfactant," and a surfactant that is stable in alkali is known as an "alkaline stable surfactant."

Both natural and synthetic surfactants can be used with this invention. Suitable surfactants or surface-active agents are often detergents, such as linear alkyl sulfonates, and are classified as anionic, cationic, or nonionic. Desirable surfactants for use in this invention are, typically, anionic surfactants. Nonionic block copolymer and anionic fluorohydrocarbon surfactants are the most desirable surfactants for use with the invention. Combinations of surfactants can be used.

The chemical structure for desirable acid stable surfactants is represented as $R-CH_2CH_2-SO_3(x)$ where $R=F(CF_2-CF_2)_{3-8}$ and $X$ can be either $H$ or $NH_4$. The acid stable surfactant can be added to most component streams before final slurring and drying of the material. The addition to a single component of the formulation, however, at a nominal loading of about one pound per 2.5 tons (0.45 kilograms per 907 kilograms) of finished material gives improved attrition resistance and selectivity compared to the same material prepared by the prior art processes. The use of an acid stable surfactant or an alkaline stable surfactant according to the invention almost completely eliminates the occurrence of "blow-holes" in the particles formed by the invention. This improvement is apparent from the photolithographs FIGS. 1A through 4B. Microtome analysis of the material particles made according to the invention demonstrates improved dispersion of individual component particles comprising the microspheres themselves. The invention provides formed particles that have superior density and hardness characteristics.

Acid stable surfactants can often be separately added into any one of the component streams of a manufacturing process, but the greatest improvement in properties of the material is achieved when the surfactant is added to all component streams prior to drying. In this situation, alkaline stable surfactants are usually added to clay or sodium silicate slurries when, for example, a sol binder is formed.

The preferred alkaline stable surfactants are effective in very low, cost-effective concentrations of about 50 to about 1000 parts per million or about 0.005 to about 0.1 percent.

The preferred alkaline stable surfactants also have a chemical structure of $R-CH_2CH_2-SO_3(x)$ where $R=F(CF_2-CF_2)_{3-8}$ and X can be either H or $NH_4$. The surfactant can be added to most component streams before final slurring and drying of a material. The addition to a single component of the material formulation, however, at a nominal loading of about one pound per 2.5 tons of finished material provides improved attrition resistance and selectivity when compared to the same material prepared by the prior art processes.

The inventors have also discovered that streams of different component material used in the manufacturing process and having at least two different surfactants can be mixed together to provide a material with desirable characteristics. Often, when two or more surfactants are acid stable more surfactants are acid stable surfactants and one or more surfactants are alkaline stable surfactants. These surfactants are selected based upon their stability in a specific steam of the manufacturing process. The following example of a mixture of an acid stable surfactant and an alkaline stable surfactant used in a single manufacturing process, having both an acidic component stream and an alkaline component stream, is provided for illustrative purposes.

A first anionic fluorohydrocarbon surfactant, that is stable in a relatively strong acid environment having a pH of about 3.0, is selected. The preferred acid stable surfactant is sold by DuPont under the trade name Zonyl TBS. The first anionic fluorohydrocarbon surfactant is added to at least one acidic stream of the manufacturing process in a sufficient concentration to prevent flocculation of the stream. The use of the first anionic fluorohydrocarbon surfactant provides further improvement in attrition resistance of the final material. A preferred process also adds the acid stable surfactant to a spray dryer feed slurry after all components have been thoroughly mixed.

A second anionic fluorohydrocarbon surfactant, that is stable in a strongly alkaline environment, is selected. The commercial surfactant sold by DuPont under the trade name Zonyl FSA is the preferred alkaline stable surfactant for use with this invention. The second anionic fluorohydrocarbon surfactant is added to at least one alkaline stream of the manufacturing process in a sufficient concentration, for example, to prevent flocculation of the clays or agglomeration of the stream particles.

The current invention includes processes using combinations of acid stable surfactants wherein one surfactant functions as a specific ionic entity and the other surfactant functions as a nonionic block copolymer. Ionic surfactants and, in particular, the fluorohydrocarbon surfactants are relatively expensive when compared to other surfactants. The combination of these surfactants allows for a reduction in the amount of the fluorohydrocarbon surfactant used in the process and provides equally effective results for improving the attrition resistance of materials prepared with only fluorohydrocarbon surfactants.

The addition of acid stable surfactants and in particular anionic fluorohydrocarbon surfactants to the process slurry significantly improves the physical and catalytic properties of materials employing a sol binder. The resulting materials have dramatically improved particle morphology with virtual no "blow-holes." The absence of "blow-holes" in the particles improves the particle hardness-attrition resistance. Moreover, the improved distribution of the various component materials such as molecular sieves, clay, and alumina that comprise the microspheroidal particles results in improved activity and selectivity for the material when compared with an identical formulation made under identical conditions, but without the addition or incorporation of any surfactants.

Anionic surfactants are the most effective surfactants in acid-sol systems, but combinations of anionic and cationic surfactants for specific components can also be effective. A specific embodiment is the combination of anionic fluorohydrocarbon surfactant in combination with an acid stable nonionic block copolymer. Typically, the use has been normalized against the clay level at approximately one pound per ton of clay. Higher loading can be used to maximize the functional characteristics and selectivity properties in a material manufacturing system.

Surfactant concentrations for use with this invention can vary significantly. Any concentration of surfactant that is sufficient to improve the physical properties of a formed particle material and not adversely effect those properties can be used. The manufacturers of surfactants provide suggested concentrations for processing particular materials with their surfactants. A suitable concentration of surfactant, is desirably, between 0.25 grams per 5 kilograms of dried product and 4 grams per 5 kilograms of dried product. Desirable concentrations of surfactant are provided with 1 to 2 grams of surfactant per 5 kilograms of dried product. The higher concentrations of surfactants do not proportionately improve the characteristics of the resulting product.

The exact mechanism by which surfactants function in material manufacturing systems is not clear. It is possible that an anionic surfactant immediately changes the charge on micelles to a strongly negative charge and, thereby, renders the micelles extremely stable against gelling or polymerization. This function has the same effect as raising the pH of a stream to a strongly alkaline pH, wherein the components of the stream are stable. Maximum attrition resistance in the final material occurs, however, when all component streams are treated with a surfactant before being combined into a single slurry and dried. The addition of the surfactant to the spray dryer feed tank, after all components have been added, and then spray drying the mixed components also results in an improved attrition resistance of the particles of the final material.

The process of this invention improves the attrition characteristics for particles that are prepared from a variety of materials. The preferred materials are inorganic oxide materials. These materials can be produced from a variety of standard procedures. The specific procedure is determined by the material being produced and the components necessary to make that material. The preferred embodiment of this invention produces inorganic oxide particles for a fluid bed reactor. Therefore, the preferred process, as described below, can be varied for the production of other materials.

The process initially mixes stock slurries and solutions of component materials. In the preferred embodiment, the component materials include a slurry of an inorganic binder, such as bentonite, and solutions of an organic binder and a surfactant. The preferred organic binder is hydroxypropyl methyl cellulose and the preferred surfactant is an anionic acid stable fluorohydrocarbon. The stock slurries and solutions of component materials are prepared in concentrations according to the art.

The organic binder solution, surfactant solution, and additional water are fed to a high shear mixing means. The feeding procedure can be a batch procedure or continuous feed procedure depending upon the facilities available. The high shear mixing means must provide sufficient mixing shear to homogeneously mix the component materials. Suitable high shear mixing means are commercially available and can include a baffled tank with an internal high shear mixer.

Upon homogeneously mixing the component materials of the organic binder solution, surfactant solution, and additional water, the material for the desired particles is added to the high shear mixing means. The preferred material of inorganic oxide is added to the high shear mixing means with continuous mixing. The inorganic binder slurry is also added to the high shear mixing means. Mixing or blending continues until a homogeneous blend of the component materials is achieved.

The blended component materials are then fed, by either a batch procedure or a continuous procedure, to a drying means. Various drying means are commercially available. A drying means is selected according to the final particles desired. Spray dryers are the preferred drying means used when a fluid particle is desired. Desirable spray dryers include "spinning wheel atomizers" operated at an atomizer wheel speed of about 10,000 revolutions per minute (rpm). The spray dryer is preferably operated at an inlet temperature of about 260° C. and an outlet temperature of about 120° C. Other drying means can be used if, for example, granules or beads are the desired particles. Other drying means include a rotary kiln and a muffle furnace.

The dried particles can be then calcined, if necessary, at a sufficient temperature to effect induration of the material. The temperature and time of calcination varies according to the material being processed. Desirable temperatures of calcination of zinc titanate or magnesium hydroxide are at least 700° C. and, more preferably, at least 800° C. The calcination temperature is, desirably, maintained for at least about 1 hour and, preferably, at least 1.5 hours. Calcining can be performed up to about 4 hours for many materials.

Other operations can accompany the calcining procedure. For example, classifying the particles according to size can be performed by a cyclone or screening procedure. Additionally, washing procedures of the occluded salts, resulting from the addition of a binder, can be performed prior to calcination. One technique to achieve the removal of the binder salt is a "pre-exchange" of the ions. In another technique low sodium content binders, such as silica sol, silica-alumina sol, or alumina sol are used to avoid washing and/or exchanging with ammonium salts or rare earth salt solutions. However, in the typical commercial operation washing, exchanging, and often intermediate calcining at about 530° C. to about 600° C. are required to adequately reduce the sodium to levels that do not impair the function of a given material formulation.

The invention when applied to mixtures of clay such as (1) kaolinite and Fuller's earth or "montmorillonite", (2) kaolinite and metakaolin, or (3) kaolinite and calcined kaolinite or "mullite or incipient mullite-spinel," produces particles with improved attrition values. The catalysts made from these particles which contain one or more of a variety of molecular sieves have improved selectivity and are extremely valuable for gas oil feeds which are high in metal contaminants such as Ni and V and high in sulfur contaminants. Moreover, these clays and combinations thereof can be used with a binder and/or alumina in the absence of molecular sieves as additives.

This invention can be applied to fluid cracking material additives also. For example, the replacement of the faujasite additives in a typical fluid cracking material formulation component with a pentasil zeolite, such as that sold under the trade name ZSM-5, in a concentration of 15 to 25 percent results in an octane additive with substantially improved attrition resistance. Since these types of additives are much more expensive to produce than a conventional fluid cracking material and, therefore, more costly for a refiner to use, better unit retention provided by the improved attrition resistance enables a refiner to operate with this type of additive with significant improvement in his overall material costs.

Additives having blends of clays with kaolin in the absence of zeolite also perform well as metal "getters" or SOX-type additives. In the past, these same combinations of clays have been tried without success, not because of their lack of functionality as metal "gettering" or SOX reduction, but simply because the attrition resistance of the fluid additive particles was poor.

FIGS. 1 through 4 illustrate scanning electron microscope (SEM) photo-lithographs at different magnifications for fluid cracking materials with and without the acid stable surfactants. Examples with specific fluorohydrocarbon surfactants are included. The particles of these photo-lithographs were formulated with 25 percent sodium zeolite in the Y form, 23 percent silica, 10 percent alumina, and 42 percent clay using a silica-sol type binder system.

Figure 1B:
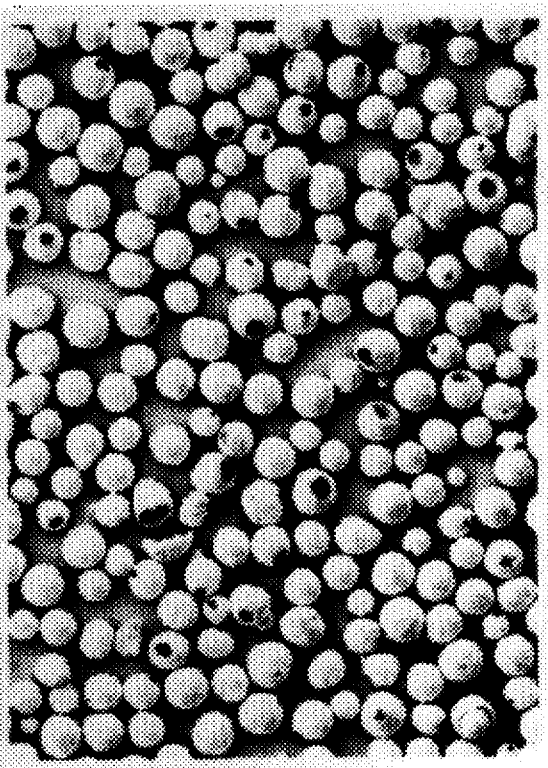

FIGS. 1A and 1B represent a typical morphology for this general type of binder system. The overwhelming majority of particles have "blow holes" and in some instances the thin shell character is easily discernible. This particular sample of particles had a Corrected Attrition Index of 12.13 and a Attrition Rate of 2.3.

Figure 2A:
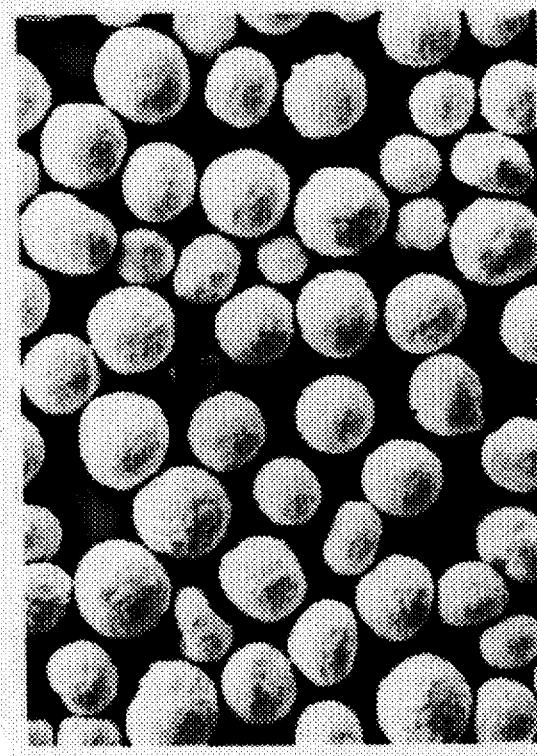
FIGS. 2A and 2B are photo-lithographs illustrating catalyst particle morphology that is produced by the addition of fluorohydrocarbon surfactants to a clay slurry.
Figure 2B:
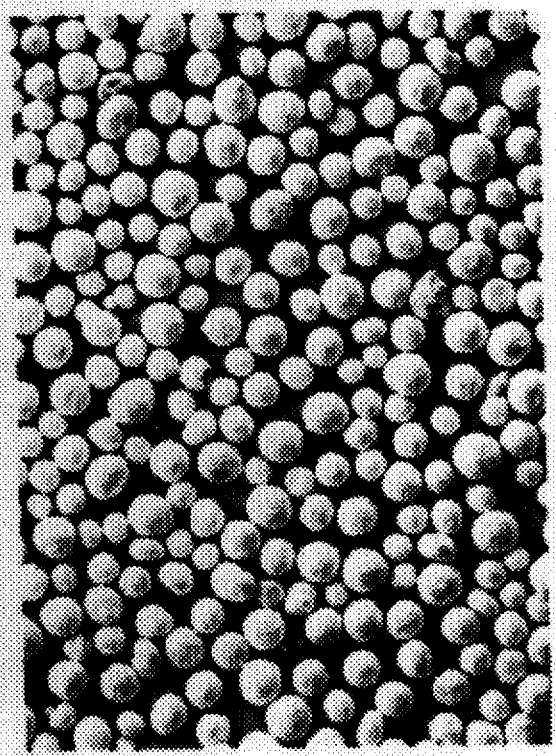

FIGS. 2A and 2B depict the effect on particle morphology when specific acid stable fluorohydrocarbon surfactants are added to the clay slurry. The "loading" for these particles was 1 gram of a fluorohydrocarbon surfactant, sold under the trade name FC-95 by the 3M Company, per 2442 grams of clay. Examination of the photo-lithographs demonstrates the almost complete elimination or absence of "blow-holes" in the particles. Moreover, broken remanents of particles indicate that a more homogeneous solid particle is provided by the invention. The attrition data for this sample had a Corrected Attrition Index of 2.39 and Attrition Rate of 0.48.

Figure 3A:
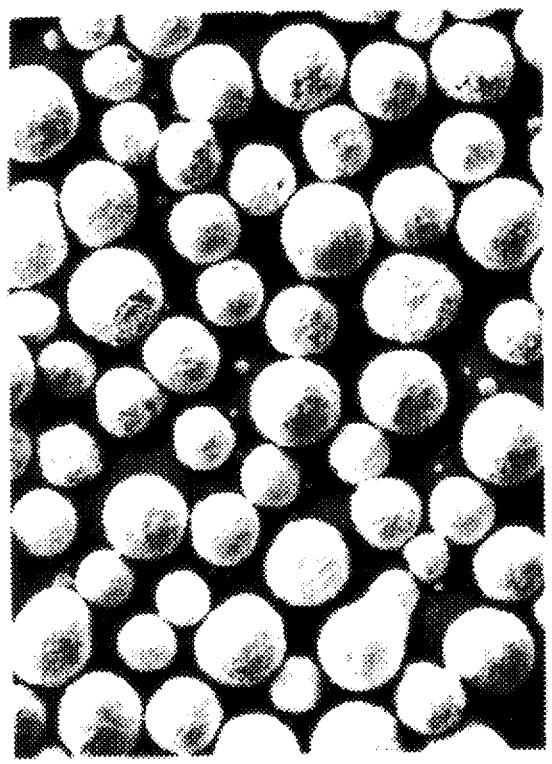
FIGS. 3A and 3B are photo-lithographs of a catalyst product that is produced by the addition of an acid stable surfactant to a clay slurry.
Figure 3B:
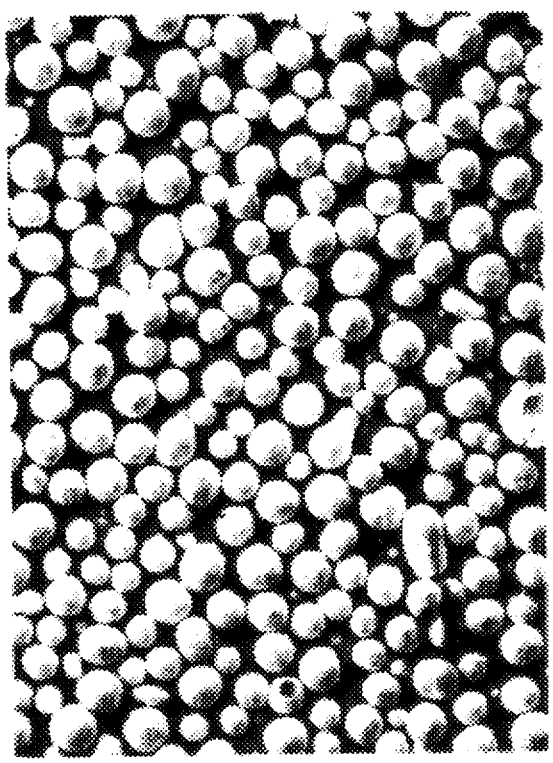

Comparable results are obtained for the product sold under the trade name Zonyl TBS at an equivalent surfactant loading. The two surfactants provide similar morphological results, but Zonyl TBS product results in a more homogenous particle. This result is evident from the smaller size of the openings and a thicker shell for the particles. FIGS. 3A and 3B illustrate the results of this surfactant.

Figure 4A:
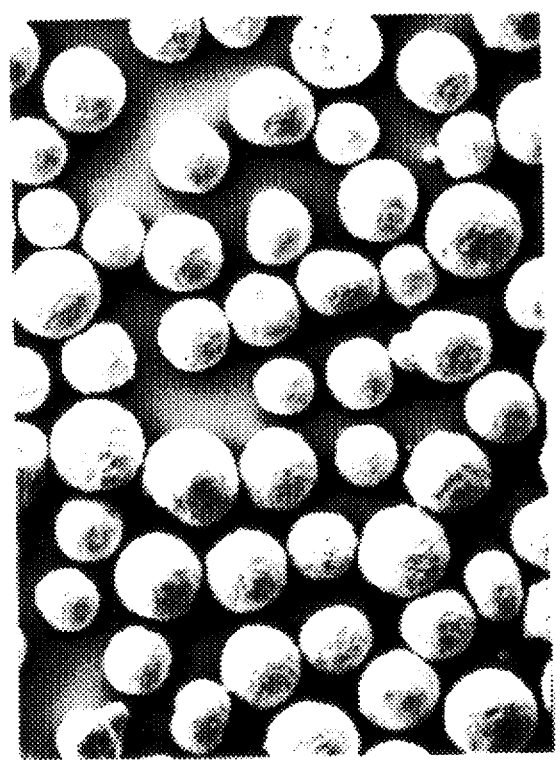
FIGS. 4A and 4B are photo-lithographs of a catalyst product that is produced by the addition of an acid stable surfactant to a clay slurry.
Figure 4B:
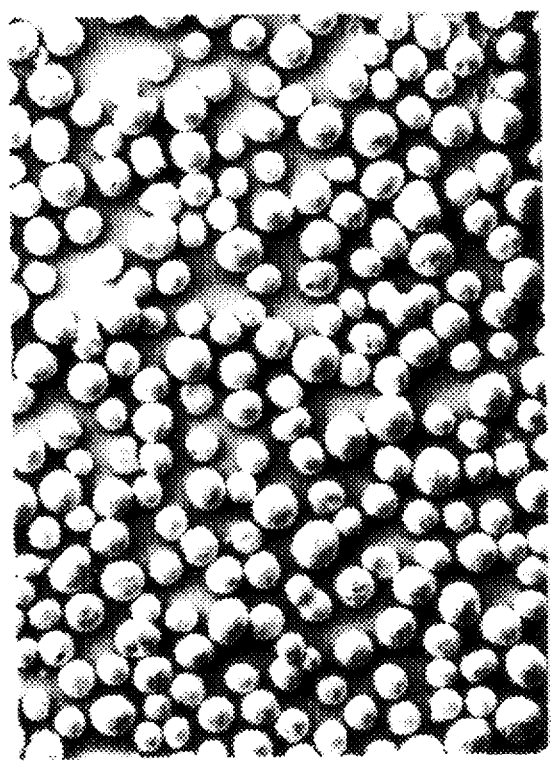

FIGS. 4A and 4B illustrate the results provided when the loading of Zonyl TBS product has been increased to 2 grams per 2442 grams of clay. The photo-lithographs show particles having almost a complete absence "blow-holes" and, correspondingly, no thin shell formation. The attrition data for this sample had a Corrected Attrition Index of 1.32 and Attrition Rate of 0.26.

The invention provides desirable non-catalytic or separation-type materials. Other notable benefits of the invention include the control of particle size and improved randomization of individual component particles in binding ceramics and superconducting formulations based on a variety of inorganic oxide systems which contain identical or similar oxide components to those used in the production of FCC materials and additives. The invention improves any system wherein the electrical charge distribution of individual components, under normal processing, prevents or hinders the integrity and functionality of the final material being processed. The use of a surfactant according to the invention changes the charge distribution of the individual component particles, such that the resulting formed material has improved integrity and functionality.

The invention includes a process for removing SOX from gases and other streams. This process involves circulating a formed zinc titanate particle in the presence of SOX. Desirably, this process is performed with fluid particles in a fluid bed reactor, but can also be performed with formed particles of granules or beads in a sieve or other means.

EXAMPLES

The following Examples represent the process of the invention. Examples 1 through 5 represent the process of the invention that utilizes surfactants with a variety of particle materials.

ATTRITION TEST PROCEDURE

The following procedure was used in the Examples to evaluate the attrition of a material.

The attrition test is similar to that described in U.S. Pat. No. 4,010,116. The procedure for the measurement is as follows.

1. A sample of material is calcined in a muffle furnace at 1000° F. (538° C.) for 1 hour.
2. A 45.0 gram sample of calcined material is mixed with 5 grams of water in a capped container and shaken to humidify the material. The sample is then allowed to cool for approximately 15 minutes.
3. The humidified material is charged to the attrition tube with a low air flow rate already established or about 1.5 liters/minute.
4. The test air flow rate of 9 liters per minute is established.
5. After 1 hour, the fines collection thimble is quickly replaced by a fresh collection thimble and the weight of collected fines is determined.
6. Step 5 is repeated at hourly intervals for a desired period. The Examples were determined using 3 hours and extrapolating to the normally quoted 5 hour value.
7. The hourly data is either plotted or entered into a computer program to give three attrition parameters discussed below. The results are expressed in terms of the following parameters.

ATTRITION INDEX (AI) at 5 hours—This value is the total amount of fines expressed as a weight percent (%), collected in the fines collection thimble after exactly 5.0 hours. The collection of data at a time not corresponding exactly to hourly intervals was corrected either graphically or by linear regression fitting. This parameter is an indicator of short term material loss in the commercial operation. A hard material is considered to have an AI of 7 or lower. Values of 12 and lower are commercially acceptable.

ATTRITION RATE This index is the rate of fines generated between 1 and 5 hours expressed as weight percent per hour. This parameter is an indicator of the longer term loss of material in the commercial fluid bed reactor unit resulting from attrition. Generally, values of 1.0 and less are desired.

INITIAL FINES (Intercept) This value is the amount of fines generated at time zero in the test. This parameter is an indication of the amount of fines (0 to about 20 microns) present in the original spray dried material. As such, it is an indicator of the amount of fines which will be lost immediately from the reactor when fresh material addition is made.

CORRECTED ATTRITION INDEX (CAI) This index is the Attrition Index minus the Initial Fines. This represents a correction for the amount of 0 to 20 micron material in the original sample as charged to the test.

Example 1

This example represents the preferred embodiment of the invention and prepares zinc titanate particles for use in a fluid bed reactor. The zinc titanate particles are formed from the inorganic oxide particles of zinc oxide and titanium dioxide.

Stock slurries and solutions of the component materials are prepared. The stock slurry of a 5 weight percent solution of bentonite is mixed. A stock solution of 0.5 weight percent of hydroxypropyl methyl cellulose sold under the trade name Methocel (K-100M) by the Dow Chemical Company is mixed. Also, 5 grams of Zonyl TBS surfactant solution is prepared such that 1 part of surfactant is diluted with 20 parts of deionized water. The surfactant solution is added to the hydroxypropyl methyl cellulose solution.

An amount of 66 pounds of the hydroxypropyl methyl cellulose solution and surfactant mixture is fed into a baffled tank with a high shear mixer. An additional 34 pounds of tap water is added to the high shear mixer and mixing is commenced. This mixture represents the binder component.

During the mixing procedure, a mixture of fine commercial grades of 1 mole of zinc oxide to 1.5 moles of titanium dioxide are added and blended with the binder component. This example uses 13.1 pounds of zinc oxide and 8.7 pounds of titanium dioxide. An additional 1.2 pounds of bentonite are added to this blend. The blending continues under high shear for at least 5 minutes or until the blend appears homogenous.

The blended material is fed to an APV spray dryer with spinning wheel atomizer. The inlet temperature is about 340° C. and the outlet temperature is about 145° C. The spray dryer feed solids have a moisture balance of about 15.3 percent solids. The spray dryer feed time is 29 minutes.

The spray dried particles are then calcined. Calcining is performed at 830° C. for one and one-half hours.

The particles produced by this example have the characteristics presented in Table 1.

Comparative Example A

This comparative example prepares zinc titanate particles for use in a fluid bed reactor. The zinc titanate particles are formed from the inorganic oxide particles of zinc oxide and titanium dioxide.

The procedures and ingredients of Example 1 are repeated for this comparative example except that no surfactant is added to the binder components. Spray drying and calcining of the particles produces formed particles having the characteristics presented in Table 1.

TABLE 1

Properties of Zinc Titanate Materials

| | Comparative Example A | Example 1 |
|---|---|---|
| Average Particle Size (μm) | 80 | 80 |
| Attrition Resistance (%) | | |
| 5-Hr Loss | 86.6 | 13.4 |
| 20-Hr Loss | 94.0 | 14.2 |
| Surface Area | 3.24 | 2.83 |
| Zn to Ti Ratio (atomic) | 1.5 | 1.5 |
| Bentonite (wt %) | 5 | 5 |
| TGA Reactivities (% wt gain at saturation) | 11.2 | 11.3 |
| TGA Sulfur capacity (wt %) | 22.5 | 22.5 |

Example 2

This example produces zinc titanate particles by the process of the invention which is then blended with a combustion promotor.

An amount of 8.5 grams of the formed particles of example 1 are homogeneously blended with 8.5 grams of a combustion promotor. The combustion promotor is alumina oxide with 900 parts per million of platinum.

The particles of this example are compared for SOX removal with a commercial standard sold under the trade name DESOX by W. R. Grace & Co. The formed particles of this example have equivalent scavenging characteristics with the industry standard. The formed particles of this example, however, had significantly improved regeneration efficiency when compared to the standard.

Example 3

This example produces zinc titanate particles by the process of the invention which is then blended with a combustion promotor.

Formed zinc titanate particles are produced according to Example 1. The zinc titanate particles are placed in a rotary chamber and sprayed with a stock solution of chloroplatinic acid with agitation. Successive applications of chloroplatinic acid are sprayed into the zinc titanate particles to impregnate the particles. Drying of the sprayed, formed particles is performed after each impregnation. The spraying is performed until a sufficient quantity of chloroplatinic acid is applied to provide 1000 parts per million of platinum to the formed particles.

Example 4

This example also produces zinc titanate particles by the process of the invention. The same procedures and conditions of Example 1 are repeated except that the mixture of zinc oxide and titanium dioxide, includes 11 weight percent of the promotor, cerium dioxide, which is added as a finely divided powder. The molar ratio of zinc oxide to titanium dioxide remains at 1 to 1.5. The resulting particles exhibit a comparable attrition resistance to the particles produced by Example 1. The particles of this example have a better ability for capturing gaseous sulfur compounds than the particles of Example 1.

Example 5

This example produces magnesium oxide particles by the process of the invention. The particles produced by this example are suitable for incorporation into plastic as a fire retardant or for use in a fluid bed reactor.

An amount of 261.7 pounds of hot tap water is added to the high shear mixer of Example 1. Then, 100 pounds of magnesium hydroxide sold under the trade name of MagChem 40 are added with agitation. A small, portable shear blade or saw blade is used to wet in the dry powder.

The dry powder is hydrated under constant agitation for 10 to 12 hours or until full hydration is achieved. The time to fully hydrate the powder varies depending on the initial water temperature, heat loss from the reaction mixture, the agitation conditions, and other variables. No additional heat, other than the heat of the hot water and the heat of reaction, is necessary.

The hydrated magnesium oxide slurry is fed to a spray dryer feed tank and mixed with a stock solution of an anionic fluorohydrocarbon surfactant sold under the trade name Zonyl UR. The slurry is then spray dried according to the procedure of Example 1.

The spray dried particles are calcined at 1000° C. for one hour. The resulting particles have desirable attrition resistance and are suitable for removal of sulfur dioxide from stack gases.

Example 6

This example produces particles according to the process of the invention. The resulting particles are known as "wash coat alumina."

A gel alumina is formed by striking a sodium aluminate stream against an alum stream. This procedure forms aluminum hydroxide gel.

An amount of 200 gallons of water is fed into a tank and heated to 45° C. A stream of alum having 8.2 percent $Al_2O_3$ and a specific gravity of 1.332 is fed to the tank at a rate of 2.3 to 2.7 gallons per minute with agitation. The alum contains 2 pounds of Zonyl TBS brand surfactant per ton of alumina produced. The flow of alum is stop 30 to 60 seconds after the beginning of the flow. After 1 to 2 minutes the pH of the solution is taken to ensure that a pH of 3.0 to 3.5 is obtained. After a total elapsed time of 5 minutes, a stream of sodium aluminate is fed into the tank. This sodium aluminate has 18.3 percent of $Na_2O$ and 20 percent of $Al_2O_3$ with a specific gravity of 1.467. The sodium aluminate stream is fed to the tank at a rate of 1.9 to 2.1 gallons per minute with agitation. The sodium aluminate stream is adjusted to maintain a constant flow rate for 15 minutes. The alum stream is fed to the tank at a rate of 2.5 gallons per minute 10 to 20 seconds after the sodium aluminate flow began. The flow of sodium aluminate is adjusted to increase the pH of the slurry in the tank to 9.0 within 5 to 5.5 minutes of elapsed time.

The pH and temperature of the slurry in the tank are checked every 1 to 2 minutes during the procedure to maintain consistent process conditions. At the end of the procedure, which is approximately 55 minutes of elapsed time, both the sodium aluminate and alum streams are stopped. The slurry is mixed for another 1 to 1.5 minutes after the termination of the flow of the streams.

The sodium aluminate is restarted at a flow rate of 1.4 to 1.6 gallons per minute to bring the pH of the slurry to 10 within 10 to 20 minutes. The pH and temperature of the slurry in the tank are check every 1 to 2 minutes during this procedure to maintain consistent process conditions.

The slurry is pumped from the tank to a belt filter and washed with ammoniated water at 60° C. and at a pH of 8. The water is ammoniated with a standard solution of ammonium carbonate.

The washed filter cake is, again, slurried in process water and spray dried to form a free-flowing powder with good dispersibility and stability and, when applied to a monolith body, can decrease the amount of noble metal required to form a catalyst. The properties of the powder are detailed in Table 2.

Example 7

This example produces a lanthanum-rich, rare earth containing embodiment of the alumina of Example 6. The procedures and conditions of Example 6 are repeated except that the rare earth chloride mixture is added to the alum prior to making the alumina strike to provide lanthanum oxide and neodymium oxide as detailed in Table 2.

TABLE 2

|  | EXAMPLE 6 | EXAMPLE 7 |
| --- | --- | --- |
| $Al_2O_3$ | >99.0% | >95.0% |
| $Na_2O$ | <0.1% | <0.1% |
| $SO_4$ | <0.1% | <0.1% |
| $La_2O_3$ | None | 3.0 to 3.5 |

TABLE 2-continued

|  | EXAMPLE 6 | EXAMPLE 7 |
|---|---|---|
| $Nd_2O_3$ | None | 0.35 to 0.45 |
| Surface Area m²/g (single point) (3 hours @ 540° C.) | 280 | 250 |
| LOI (1 hour @ 950° C.) | 25.42 | 30.00 |

Example 8

This example produces a granular formed particle from alumina. The alumina powder or Comparative A is placed in a commercial granulator and sprayed with water containing 2 pounds of Zonyl TBS per ton of alumina. The operation of the granulator produces formed particles of granular size from the powder. The granules have good stability.

Example 9

This example produces a bead-shaped formed particle from alumina. The alumina powder of Comparative A is placed in a commercial bead forming drum and sprayed with water containing 2 pounds of Zonyl TBS per ton of alumina. The operation of the bead forming drum produces formed particles of beads from the powder. The beads have good stability.

Example 10

This example produces formed particles of a silicon nitride. The procedures and conditions of Example 5 are repeated except that silicon nitride is substituted for the magnesium oxide. The spray dried particles are free-flowing.

We claim:

1. A process for producing alumina comprising:

mixing an effective concentration of anionic fluorohydrocarbon surfactant into an aqueous alum solution having 8.2 weight percent of aluminum oxide;

feeding with agitation said mixed anionic fluorohydrocarbon surfactant and aqueous alum solution into water heated to 45° C. to obtain a pH of 3.0 to 3.5 feeding with agitation aqueous sodium aluminate, having 18.3 percent sodium oxide and 20 percent aluminum oxide, into said mixed anionic fluorohydrocarbon surfactant and aqueous alum solution to obtain a pH of 9.0 of a combined slurry;

filtering said combined slurry to obtain a filter cake;

washing said filter cake with ammoniated water at 60° C. and at a pH of 8;

slurrying said filter cake; and drying said slurried filter cake to form a free-flowing powder.

* * * * *

UNITED STATES PATENT AND TRADEMARK OFFICE
CERTIFICATE OF CORRECTION

PATENT NO.: 5,711,930  
DATED : Jan. 27, 1998  
INVENTOR(S): ALBERS et al.

Page 1 of 2

It is certified that error appears in the above-identified patent and that said Letters Patent is hereby corrected as shown below:

Title page, item [54] & column 1, in the Title, "PHYISCAL" should be --PHYSICAL--.

Title page, item [75], , in the Inventors, --Joseph C.S. Shi of Bartow, Georgia-- should be included.

Column 1, line 1, "PHYISCAL" should be --PHYSICAL--.

Column 1, line 52, "bentonits" should be --bentonite--.

Column 1, line 52, "kaolinits" should be --kaolinite--.

Column 2, line 1, insert --of-- between "amount" and "a."

Column 5, line 4, "slurring" should be --slurrying--.

Column 5, lines 14, delete "acid stable" and insert --used, one or--.

Column 5, line 17, "steam" should be --stream--.

Column 6, line 16, "effect" should --affect--.

UNITED STATES PATENT AND TRADEMARK OFFICE
CERTIFICATE OF CORRECTION

PATENT NO.: 5,711,930
DATED : Jan. 27, 1998
INVENTOR(S): ALBERS et al.

It is certified that error appears in the above-identified patent and that said Letters Patent is hereby corrected as shown below:

Column 8, line 33, "remanents" should be --remnants--.

Column 8, line 47, insert --of-- between "absence" and "blow-holes."

Column 12, line 14, "stop" should be --stopped--.

Column 12, line 38, "check" should be --checked--.

Column 13, line 14, "or Comparative A" should be --of Example 6--.

Column 13, line 21, "Comparative A" should be --Example 6--.

Signed and Sealed this

Twenty-first Day of July, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.: 5,711,930
DATED : Jan. 27, 1998
INVENTOR(S): ALBERS et al.

It is certified that error appears in the above-identified patent and that said Letters Patent is hereby corrected as shown below:

Column 1, line 30, delete "5,141,905" and substitute therefor --5,135,756--.

Column 1, line 37, delete "'905" and substitute therefor --'756--.

Signed and Sealed this

Thirteenth Day of October 1998

Attest:

Attesting Officer

BRUCE LEHMAN
Commissioner of Patents and Trademarks